United States Patent
Kuehn

(10) Patent No.: US 9,420,146 B2
(45) Date of Patent: Aug. 16, 2016

(54) METHOD AND APPARATUS FOR CONTROLLING THE COLOR ACCURACY OF DIGITAL PRINTING DEVICES AND ADAPTATION TO A PREVIOUSLY DEFINED STATE

(75) Inventor: Mario Kuehn, Duisburg (DE)

(73) Assignee: Electronics for Imaging, Inc., Fremont, CA (US)

( * ) Notice: Subject to any disclaimer, the term of this patent is extended or adjusted under 35 U.S.C. 154(b) by 88 days.

(21) Appl. No.: 13/286,009

(22) Filed: Oct. 31, 2011

(65) Prior Publication Data

US 2013/0107291 A1    May 2, 2013

(51) Int. Cl.
G06F 15/00 (2006.01)
G06K 1/00 (2006.01)
H04N 1/60 (2006.01)

(52) U.S. Cl.
CPC .......... *H04N 1/6036* (2013.01); *H04N 1/6052* (2013.01); *H04N 1/6055* (2013.01); *H04N 1/6097* (2013.01)

(58) Field of Classification Search
USPC .......................................... 358/1.9, 501, 504
See application file for complete search history.

(56) References Cited

U.S. PATENT DOCUMENTS

| | | | |
|---|---|---|---|
| 5,416,890 A | 5/1995 | Beretta et al. | |
| 8,456,693 B2 | 6/2013 | Hansaki et al. | |
| 8,456,709 B2 | 6/2013 | Uratani et al. | |
| 2002/0036787 A1 | 3/2002 | Kondo et al. | |
| 2002/0080374 A1 | 6/2002 | Okamoto et al. | |
| 2002/0085235 A1 | 7/2002 | Degani | |
| 2003/0034983 A1 | 2/2003 | Muramoto et al. | |
| 2004/0012817 A1 | 1/2004 | Brewington | |
| 2005/0018256 A1* | 1/2005 | Corbin et al. | 358/501 |
| 2005/0225784 A1 | 10/2005 | Jacob et al. | |
| 2007/0146742 A1 | 6/2007 | Klassen | |
| 2007/0268502 A1 | 11/2007 | McCarthy | |
| 2008/0309968 A1 | 12/2008 | Berestov et al. | |
| 2009/0086290 A1 | 4/2009 | Ming et al. | |
| 2009/0147279 A1* | 6/2009 | Ming | 358/1.9 |
| 2009/0290171 A1 | 11/2009 | Albat | |
| 2011/0032545 A1 | 2/2011 | Mestha et al. | |
| 2012/0154831 A1* | 6/2012 | Wu et al. | 358/1.9 |

FOREIGN PATENT DOCUMENTS

| | | |
|---|---|---|
| CN | 101959001 | 1/2011 |
| CN | 102065204 | 5/2011 |

\* cited by examiner

*Primary Examiner* — Vincent Rudolph
*Assistant Examiner* — Michael Burleson
(74) *Attorney, Agent, or Firm* — Michael A. Glenn; Perkins Coie LLP

(57) ABSTRACT

A method and apparatus are provided for providing color consistency on a same digital printing device at different points in time or on multiple digital printing devices. Measured spectral color values, which correspond to a particular calibration set of a printer-ink/toner-media combination, are stored as target values. Spectral color values are measured subsequently for the same printer or for other printers and compared to the target values to determine whether the output data of both printers will be consistent. Optimization processes may be performed to ensure or improve consistency.

16 Claims, 6 Drawing Sheets

METHOD AND APPARATUS FOR CONTROLLING THE COLOR ACCURACY OF DIGITAL PRINTING DEVICES AND ADAPTATION TO A PREVIOUSLY DEFINED STATE

BACKGROUND OF THE INVENTION

1. Technical Field

This invention relates generally to the field of digital printing systems. More specifically, this invention relates to controlling the color accuracy of digital printing devices and adaptation of such devices to a previously defined state.

2. Description of the Related Art

Operators of digital printing systems typically face a problem of deviations in the color output. Color output may differ from device to device. As an example, operators may need to run production on two different devices and may find that the output, e.g. the printed products, deviate in color consistency from one another. Sometimes the deviations are acceptable, sometimes not. As well, color output from a same device but at a different time may also differ. As an example, an operator may have printed some banners for a customer one day. Then, the customer may have returned on a subsequent day, asking for more printouts of the same banner. In this scenario, it is typical that the operator may find that the printing device has drifted for one reason or another from its previous state when it first printed the banners. The change in the printer then causes the second run of the printing of the banners to deviate from the first run. Again, sometimes the deviations are acceptable and sometimes not.

SUMMARY OF THE INVENTION

A method and apparatus are provided for providing color consistency on a same digital printing device at different points in time or on multiple digital printing devices. Measured spectral color values, which correspond to a particular calibration set of a printer-ink/toner-media combination, are stored as target values. Spectral color values are measured subsequently for the same printer or for other printers and compared to the target values to determine whether the output data of both printers will be consistent. Optimization processes may be performed to ensure consistency.

DETAILED DESCRIPTION OF THE INVENTION

Figure 1:
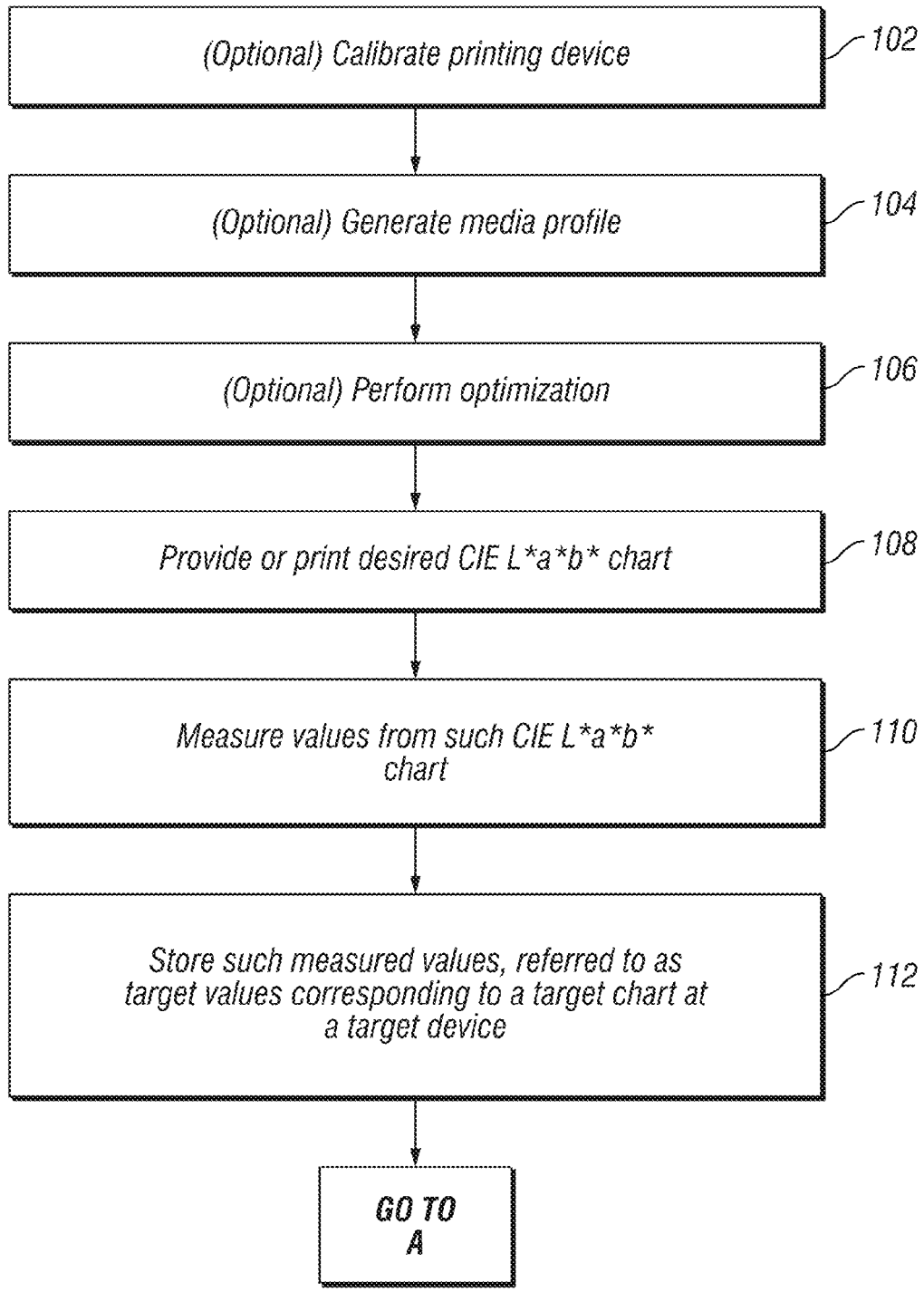
FIG. 1 is a flow diagram of a workflow of capturing, storing, and using snapshot values, according to an embodiment.
Figure 1:
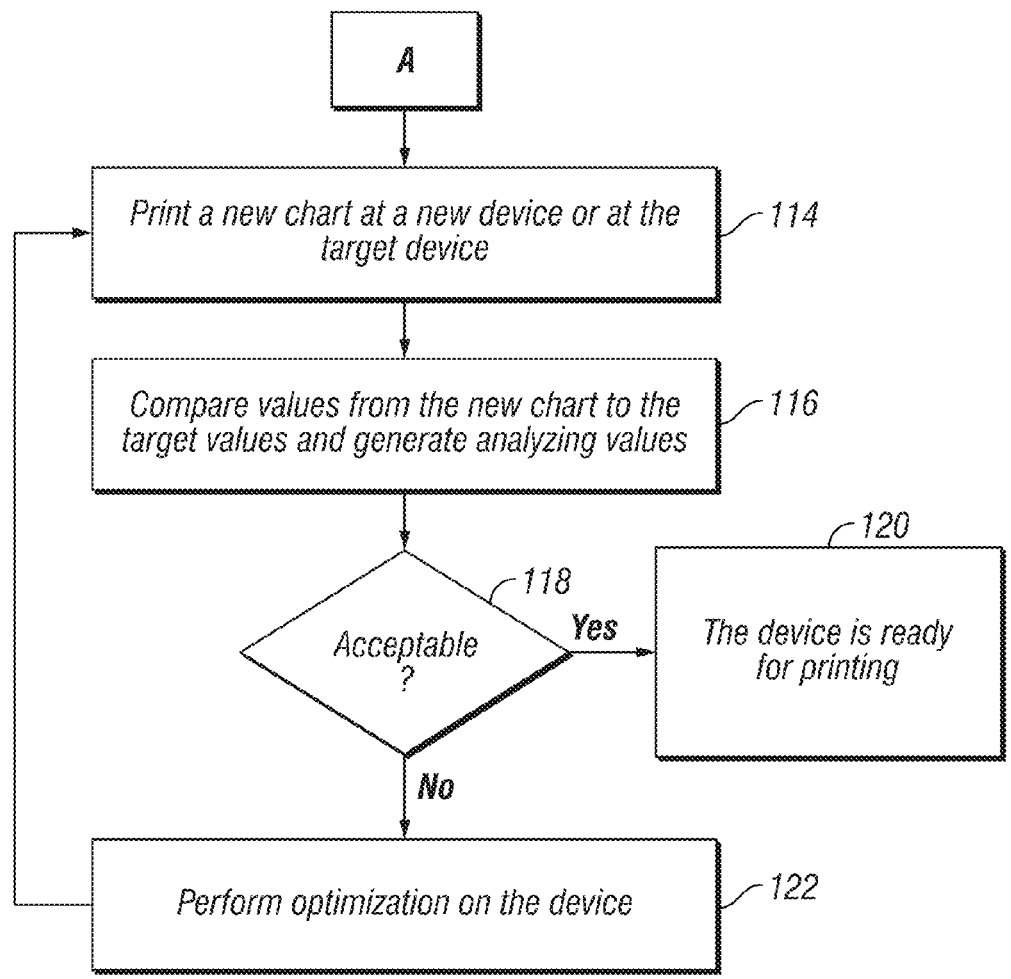

It has been found that color consistency, i.e. the reproducibility of previously reached color results, is an important quality factor within an automated digital production process. For example, a user may print 20 copies at a particular calibration on one day and finds that he or she needs to print 10 more copies of the same image the next day. Such user would hope that the color consistence between the two printing jobs is at least sufficiently acceptable. Therefore, it has been found that features such as checking the digital printing system and subsequently applying, if necessary, an easy-to-use correction of possible deviations, are important features of a calibration and color controlling software system.

Users who work with digital printing systems typically face the problem of deviations in the color output. For example, color output may differ from device to device. Sometimes the deviations are acceptable sometimes not. Thus, embodiments described herein provide an easy-to-use way for users to check whether their device or devices produce deviations on color output and an easy-to-use way to correct such device or devices. Such correction may include bringing the current state of output quality of the device(s) back to a previously defined state of output quality.

Present day techniques for addressing the problem of deviations in the color output are as follows. A user may perform some very basics checks which involve checking the pure colorants and applying certain adjustments. A user may alternatively perform a time consuming, new calibration process which may give good results most of the time; however is a process that is completely decoupled from the previously reached results. It should be appreciated that in both cases above, the output colors may still differ from the previously reached results, which is undesirable.

As well, it should be appreciated that a present huge hurdle is that one-dimensional corrections, such as dot gain, only correct for a single colorant. Thus, variations which occur in the combination of two or more colorants are neither stored in the target/reference values nor adapted with a one-dimensional curve. Such variations which occur in the combination of two or more colorants may not be stored in the target/reference values nor adapted with a one-dimensional curve, because of the following. That is, there may be several reasons why the one dimensional correction curve does not give the expected results or the needed accuracy, as follows:

For ink jet devices it is a state of the art that they are using for one colorant, e.g. Cyan, a light ink-norm-ink combination, e.g. Light Cyan and Cyan. The usage of a one-dimensional curve would not give the needed accuracy because the light-norm-distribution function cannot be corrected with just addressing the overall ink amount nor is there a possibility to address the light ink independent from the norm ink without changing the color appearance.

Printing more than one colorant on top of each other and the subsequent appearance after such colorants drying on the media is a complex system. Just adjusting the single tonal curve may not give the needed results:

For instance, consider a physical parameter change, e.g. the printer receives a new stock of media, which has a different amount of water bounded in the substrate: The suction and the drying of the ink or the amount of toner on the surface are different from the previous media. Thus, the printed color subsequently may appear different. Putting more or less ink or toner on the substrate may not solve the color problem.

As another example, consider ink or toner cartridges being changed during a printing process and where the color of them is slightly different than the previous one. Maybe just one colorant shows this effect. There is no solution when more or less ink or toner is just put on the substrate to try to overcome this situation.

It should further be appreciated that even if the above processes provide satisfactory or even very good results, there is no guarantee that such results match previously reached color outputs in an acceptable manner. Thus, it is desirable for embodiments herein to couple calibration processes with states of previous calibrations, as described in further detail hereinbelow.

Snapshot of State of Printer

In an embodiment, a CIE L*a*b* chart is generated in which the patches or values thereon are in an independent color space. It should be appreciated that when such chart is printed by a printing device, advantageously, no other color transformation, apart from transforming from L*a*b* to the printer color space, need be performed.

Thus, the printer's effect upon printing the CIE L*a*b* chart using the printer device's profile can be determined. That is, the state of the printer can be determined by having the printer print such chart.

Thus, according to the embodiment, it is possible for the state of the printer to be captured. Or, put another way, a snapshot of the printer's state or condition can be stored in a volatile or non-volatile memory.

Then, because the snapshot of the state of the printer is known and can be accessed or retrieved, then it is possible to put the same printer under the same condition as represented by the snapshot at a later point in time. As well, it is possible to set one or more other printer devices to the same condition as represented by the snapshot at a later point in time. Thus, by setting the same or other printing devices to the calibration values as stored in the snapshot, it is possible for the devices and, thus, for the users to reproduce printouts at a quality that has been reached before.

Workflow for Capturing, Storing, and Using Snapshots

An embodiment may be understood with reference to FIG. 1, a flow diagram of capturing and storing snapshot values. In the embodiment, a typical or standard calibration is performed (102) by a user or automatically by the system, for example. It should be appreciated that while performing calibration before taking a snapshot of the printer's state is desirable and may be recommended, performing calibration may not be required by the embodiment. Also, one skilled in the art would readily recognize what is meant by performing calibration and need not be discussed in detail herein. For example, in an embodiment, performing may include performing printer linearization with inkjet printers and the like.

Then, in accordance with the embodiment, a media profile is generated based on the calibration values (104). For example, a media profile is created based on printer linearization. Or, as another example, a media profile is generated for toner-based devices. Again, it should be appreciated that one skilled in the art would readily recognize techniques by which to generate such media profile. As well, generating the media profile may be optional.

Next, in accordance with the embodiment, optimization is performed (106). For purposes of discussion herein, optimization means a technique for getting a media profile closer to a particular, e.g. standard, target. For example, suppose a user would like have his or her output be in accordance with the International Organization for Standardization (ISO) printing standard. Optimization, as used herein, is the process by which the printing device gets closer to the ISO standard. Optimization is a procedure on top of or in addition to the creation of the media profile. As well, one skilled in the art would readily recognize techniques by which to perform such optimization. And, performing optimization may be optional.

Thus, in an embodiment, regardless whether a new calibration is performed, a new media profile generated, and optimization performed, a desired CIE L*a*b* chart is provided (108). For example, a user may iteratively calibrate his or her printing device, generate and print a test printout until he or she is satisfied with the reached result.

Once the desired CIE L*a*b* chart is obtained, such chart is measured (110). One skilled in the art would readily recognize techniques for measuring chart values and need not be discussed in detail herein.

After measuring values from the CIE L*a*b* chart, such measured values are stored in accordance with the embodiment (112). Thus, the measured and stored values obtained from a particular state of a particular printing device may be referred to as defining the target printer having a corresponding target chart.

Now that the target chart has been defined and stored, such target chart may be compared with any other chart that corresponds to any other device with the aim of getting the other device to calibrate to the same set of printing conditions as the target device. It should be appreciated that "any other device" may include the same printing device, most likely at a different point in time. As an example, with this target definition a user may now begin every morning or every week by comparing and adjusting his or her printing device to the target device.

In an embodiment, and at a time subsequent to generating and storing the target chart, a user may print a chart again from the same device or different device (114) at which the user intends to print print jobs that result having the same quality and characteristics (up to an acceptance level) as results produced by the target printer using the target chart.

Compare the currently printed chart to the stored values from the measured target chart (116) for the purposes of determining whether there are any changes from the target chart values to those of the newly printed chart.

It should be appreciated that an embodiment generates values by which the printing results may be analyzed (116). For example, an embodiment may generate analyzing values which are known to one skilled in the art, such as but not limited to: Delta-E values, average peak, and other values which assist in determining whether the printing results are still in good shape, i.e. acceptable.

Based on the generated analyzing values, the embodiment determines whether the printing results are within acceptable tolerances (118.) Such determination may be performed automatically or manually. For example, the user may determine whether the changes are within acceptable tolerances or whether some measurements are off. Thus, a user may detect whether his or her machine is still in good shape.

In an embodiment, when it is determined that the printing results are within acceptable tolerances, then that means that the device is ready for printing (120). Thus, for example, the printing process proceeds.

In an embodiment, when it is determined that the printing results are not in good shape or are not within acceptable tolerances, optimization is performed on the printing device, causing the printer's calibration values to be brought closer or within acceptable ranges of the target values (122).

After optimization, control may returns to step (114) at which another chart is printed at the device, and so on, iteratively, until the generated analyzing values are determined to be within an acceptable tolerance and the device is ready for printing.

As another example to illustrate how the process may be useful to print professionals, a user may have entered another ink into the printer and is now obtaining different printing results. Thus, now a user may easily see on the reached results that something happened. The change may be because of some other surrounding condition or may be because his or her machine is just drifting over the time. The reasons are varied and numerous as to why printing results may differ.

It should be appreciated that the target values do not change. The target values are stored and other values are compared to the target values. This snapshot is used for each and every comparison.

As another illustration, calibrating to the target values may be performed after an important and possibly expensive production run for an important customer. For example, suppose a small printing company has printed 20 banners for an important customer. Suppose further that the professional at the small printing company subsequently (or previously) prints out the target chart that corresponds to the printing of 20 banners. Then, the small printing company receives a request to please produce another five copies of the banner. Thus, according to the embodiment, the print professional may take out the corresponding target chart, compare the current status of the printing device with such target chart, adjust the printing device, and then print the additional five copies.

It should be appreciated that an embodiment provides for getting two different printers to produce the same output in terms of quality. For example, for production, it may be best to use the same type of devices for one print job and where such devices have the same media inside. However, professionals may readily recognize that often having the same printer on site is not reality. For example, a printing company may have a device that they use very often, but they may have another device which is maybe a little bit of cheaper quality and this is not used not as often. Such cheaper printer may be used in time crunch situations. Or the company may have second device which they like to use for mockups. For instance, the printing company may want to make a sample or proof for the customer on the mockup device without disturbing production on other devices.

In the cases above, an embodiment provides for defining one printing system as the master system and proceeding with the same steps as mentioned before with the master system corresponding to the defined target values. Thus, for example, the professional performs calibrations, creates media profiles, and performs optimization until the professional is satisfied with the results for this particular media. The professional ensures that the values corresponding to the results are stored. That is, the professional stores his or her snapshot. After generating and storing the snapshot, the professional may then go to a second device or third device and calibrate such devices to the master device, as outlined in the same procedure above.

Thus, in an embodiment, the professional also calibrates the second or this device if he or she has not done so yet and continues to proceeds as outlined in FIG. 1. After printing and measuring the same CIE L*a*b* chart the professional compares the results on the second machine (or how many other machines required) with the results from the master system. When the analyzing values have a certain distance from the target or master values, the professional ensures optimization is performed. Thus, the second or third printer gets as close as possible to the master device.

It may be appreciated that while the analysis values may not reach a Delta E of zero, an embodiment enables the calibration values to get as close as possible to the target values by such algorithm that includes comparison, optimization, and subsequently printing a sample.

Exemplary Embodiments for Controlling the Color Accuracy of Digital Printing Devices and Adaptation to a Previously Defined State While one or more exemplary embodiments and implementations are described hereinbelow with particular details, it should be appreciated that such details are for illustrative purposes only and are not meant to be limiting.

An embodiment addresses the assumption that to monitor a digital printing device, having the correct definition of the target values may be substantial. It has been found that it is not enough to use just the tonal values for the pure colorants or a certain well defined CMYK reference color space because the digital printing system might be used also for the output of RGB data or CIE L*a*b* defined spot colors. Thus, to cover such requirements and more, it is desirable to use a measurement chart defined in the device independent CIE L*a*b* color space, which covers the areas of the printer color space.

Printing such measurement chart, measuring the color patches and the storing of the target values may be viewed as the last step within the well-defined calibration process according to an embodiment. The operator processes the calibration of a particular printer-ink/toner-media combination or calibration set by practices known to one skilled in the art. Such process may include some or all of the following steps:

Create a printer linearization, e.g. ink limiting for each individual colorant, total ink limit definition, definition of the norm-light ink distribution function, etc.

Create a media ICC profile.

Process a color optimization.

After finishing such process the user may print the above mentioned CIE L*a*b* chart using a linear CIE L*a*b* to CIE L*a*b* ICC profile and the above mentioned calibration set, printer linearization and media profile. Then the user may measure the color patches with a measurement device known to one skilled in the art, such as a spectrophotometer. In an embodiment, the measured spectral color values are stored in a particular container that belongs to or corresponds to, the calibration set of this printer-ink/toner-media combination as target values for future comparisons. For example, it may be possible to use multiple containers to store of the target values, e.g. Mime, zip or etc. Important is the content of this container. Here, required is the calibration file, e.g. the printer linearization, the media profile, and the file including the spectral measurement results. Embodiments using the technique described herein may be required to choose such a container and use the embedded files properly.

In an embodiment, In the case of storing a snapshot of the system after the calibration (as a master target) step is finished, the container is created automatically after measuring the CIE L*a*b* chart but may remain beside the media profile and the linearization file within the proper folder. As well, it may be desired to store the snapshot of the system after finishing an important print job. The container becomes a part of the backup.

Thus, an embodiment provides the user with the ability to check the consistency of his or her digital printing device whenever necessary or desired. For example, it may be recommended for the user to check the consistency of his or her digital printing device every morning before starting a production process.

In an embodiment, consistency check may be a straightforward process for the user, as follows. Such user prints the same CIE L*a*b* chart using the same linear CIE L*a*b* to CIE L*a*b* ICC profile and the same above mentioned calibration set and subsequently measures the output again with the spectrophotometer. The system compares the new measurement results with the previous results, i.e. the previously measured target values, and computes color distances, e.g. CIE Delta E values, for each and every patch. Once the system computes the color distances for each and every patch, the system offers the user an overview about the status of his or her device. For example, the system may display additional analytic parameters, such as peak CIE Delta E and average CIE Delta E. One skilled in the art would readily recognize that a wide variety of displayed parameters are possible and are within scope of the embodiments. If the system determines that one or more of the comparison methods exceeds a definable border or tolerance, the system then processes an optimization step. Processing the optimization step includes generating a CIE L*a*b* to CIE L*a*b* correction profile with the goal to, e.g. configured to, reduce the color distance between the target and current measurement results. Thus, such CIE L*a*b* to CIE L*a*b* correction profile is applied to the color calculation process right upfront the media profile and used from the RIP for the output data processing. Thus, the print data, independent from the input color space of the source data, are generated by using this new correction profile.

Figure 3:
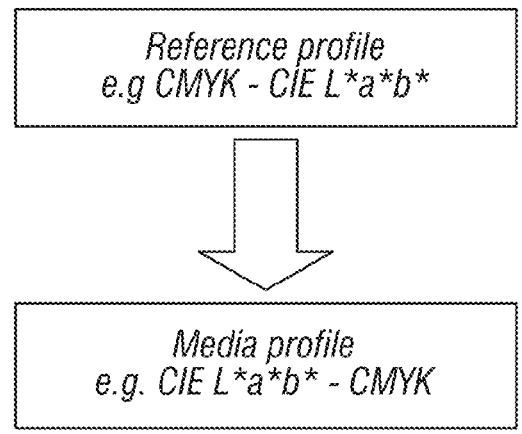
FIG. 3 is a block schematic diagram showing generating a media profile from a reference profile, according to an embodiment.

For purposes of discussion herein, applying a CIE L*a*b* to CIE L*a*b* correction profile to the color calculation process right upfront the media profile and using such from the RIP for the output data processing reflects the processing order of the ICC profiles within the color management module (CMM). For example, in a standard color management workflow, a reference and a media profile within the CMM module are used as in FIG. 3.

Figure 4:
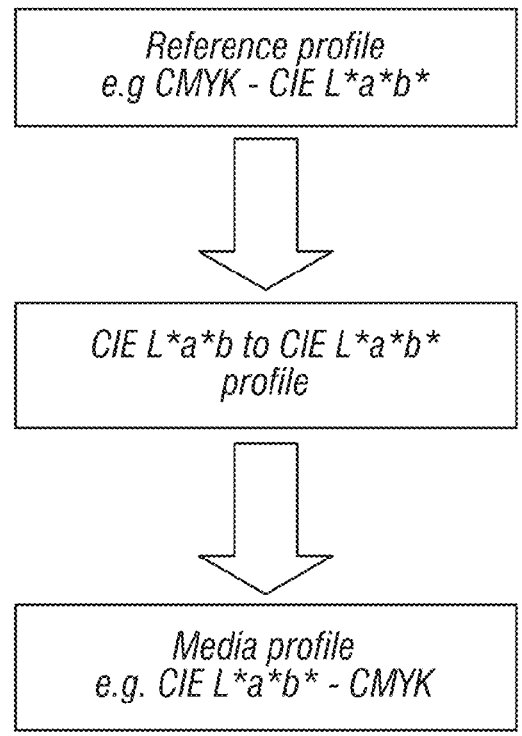
FIG. 4 is a block schematic diagram showing generating a media profile from a reference profile, according to an embodiment.

Subsequently, the CIE L*a*b* to CIE L*a*b* profile is added into this processing and appears as in FIG. 4.

Figure 5:
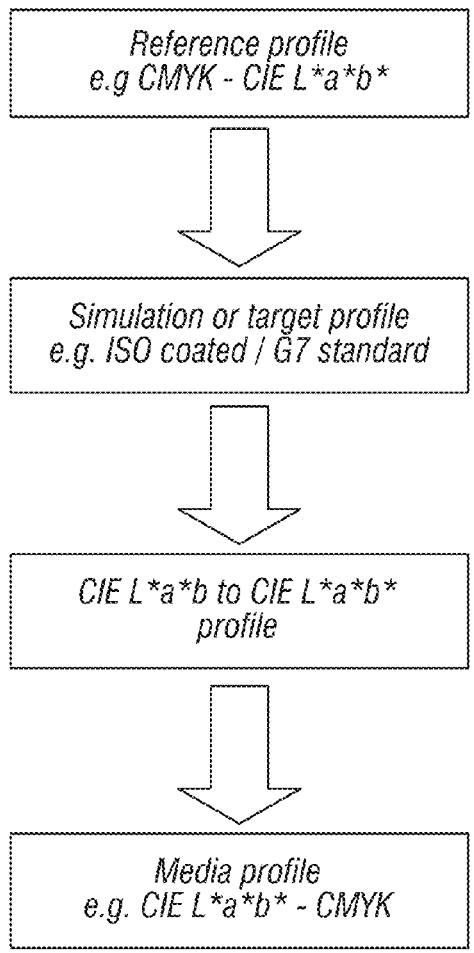
FIG. 5 is a block schematic diagram showing generating a media profile from a reference profile, according to an embodiment.

It should be clear that having three profiles in a row may mean that the user desires to simulate a target with its output. Following is a flow showing the usage with the CIE L*a*b* to CIE L*a*b* correction profile, resulting in four profiles which the CMM module processes in the following order, as in FIG. 5.

If needed the user may check the reached results by printing the same CIE L*a*b* chart using the new created CIE L*a*b* to CIE L*a*b* correction profile and the same above mentioned calibration set and measure the output again with the spectrophotometer. The reached results should be now within the previously defined tolerances.

In another embodiment, when the printer has an embedded spectrophotometer, the user may schedule this procedure and process it automatically.

In another embodiment, the above-described procedure provides a base or core workflow for color consistency output on multiple devices. In accordance with such embodiment, the operator may define one device as master or reference device. Then the operator processes the calibration of the specific printer-ink/toner-media combination by practices known to one skilled in the art. Such process may include some or all of the following steps:

Create a printer linearization e.g. ink limiting for each individual colorant, total ink limit definition, definition of the norm-light ink distribution function, etc.
Create a media ICC profile.
Process a color optimization.
Print the CIE L*a*b* chart using a linear CIE L*a*b* to CIE L*a*b* as source ICC profile and the above created calibration set and measure such chart with a spectrophotometer.

The measured spectral color values are stored in a particular container that belongs to the calibration set of this printer-ink/toner-media combination as target values for future processing steps.

Subsequently, the operator selects a second output device (child device) and defines for this output device the previously created reference device. For example, an embodiment may offer an option where the user selects a particular output device and chooses another one as master or target.

Figure 2:
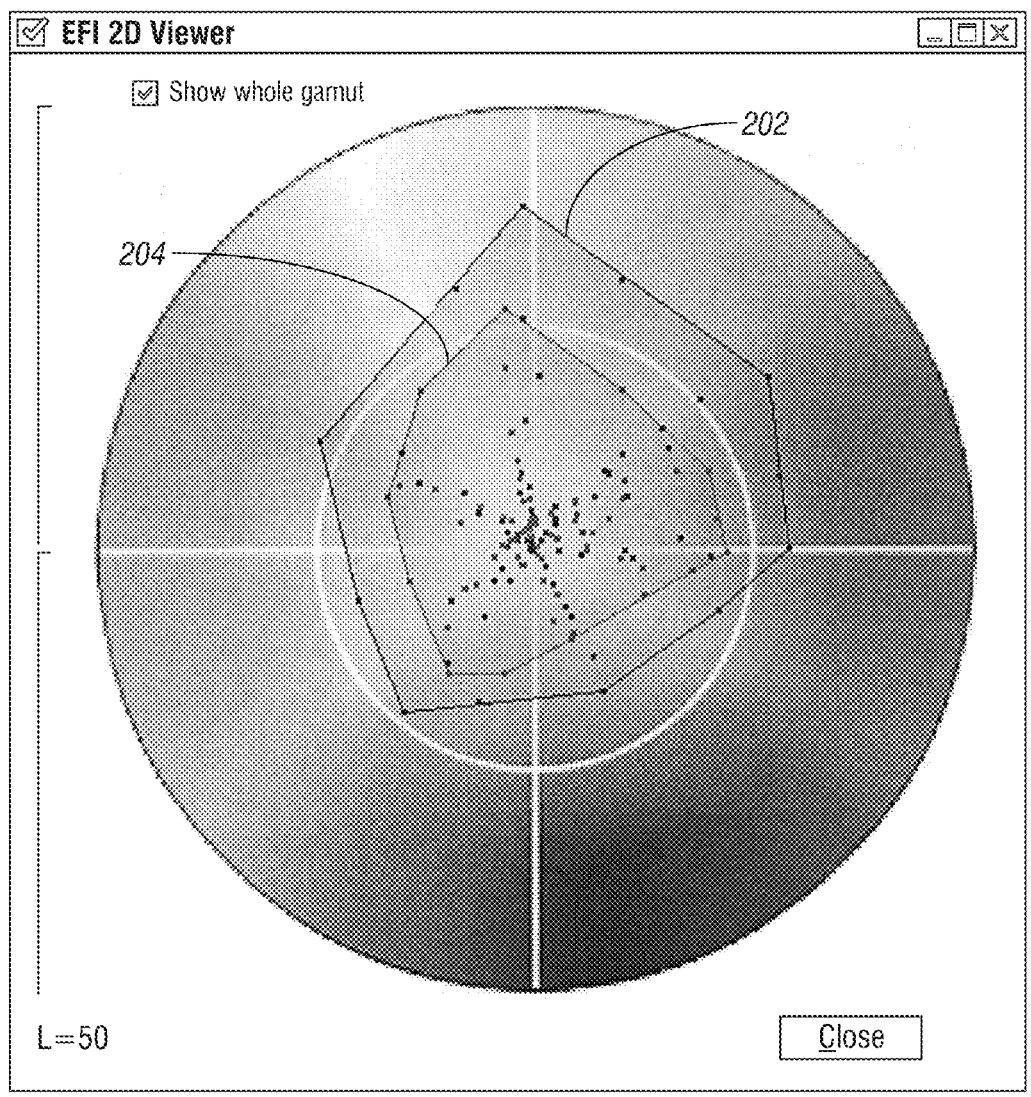
FIG. 2 is an example screenshot showing two devices with very different color spaces, according to an embodiment.

It should be appreciated that in accordance with an embodiment, it is recommended that the other printer-ink/toner-media combination has a wider color gamut than the reference device. It has been found that the reachable accuracy of the entire procedure is limited when this is not the case. An embodiment may be understood with reference to FIG. 2, an example screenshot showing two devices with very different color spaces. It should be appreciated that such example is an extreme example for illustrative purposes. In the example, consider that the larger (outside) color space 202 is the target/master color space and the smaller (inside) color space 204 is the child color space. The technique described herein may not solve the problem that the child system is not able to reproduce the larger master color space. In the end having a larger color space is a requirement for each proofing system and the child system may be referred to as a kind of proofing system of the master. Thus, what may happen is that colors in the area beyond inside color space 204 but within outside color space 202 cannot be reproduced accurately. There may be no way to print anything beyond the border of inside color space 204 with the child device. Thus, the colors may be printed within inside color space 204, however resulting in a large color distance/delta E. The technique described herein may be used to adapt colors within inside color space 204 with corresponding colors in outside color space 202 and lower the delta E value between the two outputs in this area to a minimum. However, nothing may be done for the colors which aren't covered within inside color space 204, but which are printable within the master system.

In the embodiment, the system processes an optimization for the second printer by using the stored measurement results from the reference device as target values. The goal or desired result is to bring both systems as close as possible together by bringing the second printer closer to the target or master device.

In an embodiment, the operator may see the reached results and in response decide whether he or she would like to perform one or even more optimization steps.

The output of the process is a CIE L*a*b* to CIE L*a*b* correction profile which gets applied to the color calculation process right upfront the media profile on the child device, as discussed hereinabove.

The user may apply this procedure multiple times to correspond with multiple printers. In this way, an embodiment may include one reference device and several color adapted child devices. In accordance with an embodiment, each child device is treated and optimized independently from the other.

In another embodiment, the processing of the daily consistency check for the reference device is the same as mentioned above. However, daily consistency checking may be slightly different for a child device. It should be appreciated that the consistency check for a child system may differ from the consistency check of a single system but also from the state of the art. The single system uses its own target for comparison and correction. What is novel here is that the master device settings are used as target and not the results from the first adaptation of the child device. Such technique has the important advantage that regardless where the child system resides at any moment in time such system gives the best match to the master system. Thus, in the end, in accordance with an embodiment, the lowest possible Delta E values are provided in comparison with the master system and by not trying to achieve a previously reached result of this particular machine.

The system takes the previously stored master target data, prints the same CIE L*a*b* chart using the generated correction profile and the above mentioned calibration set and measures the output again with the spectrophotometer. The system compares the new measurement results with the master target values and computes the color distances, e.g. CIE Delta E values, and offers the user an overview about the status of that particular device, e.g. presents peak CIE Delta E, average CIE Delta E, etc. When one or more of the comparison methods exceed a definable border or tolerance level or threshold value, the system performs optimization and creates a new CIE L*a*b* to CIE L*a*b* correction profile to reduce the color distance between the target and current measurement results. The output of the process is a new CIE L*a*b* to CIE L*a*b* correction profile which gets applied to the color calculation process right upfront the media profile for the child device.

Further Discussion and Alternate Embodiments

It should be appreciated that some state of the art systems may compare the output accuracy against a certain standard, e.g. ISO, G7, etc. Such systems use CMYK patches for printing, measuring, and, at end, calculating Delta E values. Such values provide a certain hint about the output. However, it has been found that an issue with Delta E is that it may not show a direction of the difference. For example, Delta E=2 today and Delta E=2 tomorrow may mean an absolute difference or magnitude of Delta E=4 between yesterday and today, assuming the measurement yesterday lies opposite from the target point in the color gamut from the measurement today. Such result may be acceptable and proven for the verification. However, for reproducing the results from day zero, such technique does not help.

For example, consider when the following parameters have the following values:

Target value: L=50, a=15, b=3;
Measurement 1: L=50, a=13, b=3; and
Measurement 2: L=50, a=17, b=3.

As discussed hereinabove, embodiments may verify the correctness of an output as viewed against target values. As can be readily ascertained, Measurement 1 and Measurement 2 each give a Delta E of 2.

It should be appreciated that in this example and in accordance with embodiments herein, the verification of Measurement 1, which is made after the system generates and accepts the target values, is verified and rated as good. However, when the system shows the above-mentioned results, then it is apparent that there is a Delta E of 4 between the first output (Measurement 1), which is determined to be a good and accepted output, and the second output (Measurement 2), which could be at any subsequent point of time.

It should be appreciated that in this example, Delta E of 4 is useless for providing operators (and ultimately the customers) with a correct reproduction of a previously made result.

Thus, because embodiments herein determine Delta E based in part on direction, it should be apparent that embodiments herein would prevent generating an erroneous Delta E, such as the aforementioned Delta E=2 when Delta E actually is equal to 4.

For purposes of discussion herein, the term, opposite, in this context means the deviation from the target (Fogra standard) is in the opposite direction within the CIE Lab color space. In the example hereinabove, the "a" value is lower than the target value in Measurement 1 but higher in Measurement 2.

Put another way, when the Delta E equation gives a result without showing a direction of the deviation, it is as if the range of acceptable values may be viewed as a ball of a certain radius around the target value. Thus, measured results may be considered as circling around the target value and as not to be failing the verification criteria. While such technique may be acceptable when verifying values for obtaining a proof, it should be appreciated that such measured values may fail to achieve the desired output results, desired to be as close as possible to a previous print run. Such system fails because the deviation from the previous results is not rated accurately. That is, with the proof certification approach described above, the first output may also have a deviation with respect to the standard and this is the issue. Proof certification approach may means that the two outputs may be much further away from each other than the verification procedure as described in accordance with embodiments herein. Thus, it is apparent that with comparing all subsequent measurements with the results gathered with the Measurement 1 (as provided in embodiments herein), this technique overcomes such limitations and shows the absolute distance of the digital printing system between the day 1 and the subsequent day.

Thus, embodiments described herein provide novel techniques for comparing and optimizing against the state of the system at day zero.

An important advantage of techniques described herein is the usage of the CIE Lab chart. It should be appreciated that state of the art may use certain CMYK defined charts. It has been found that such charts may have to be printed either without any ICC profile or with a certain CMYK reference profile, e.g. ISO standard profiles. In the first case, a user obtain the output of the printer without color management so the process does not consider the media profile used, which may have a large influence on the output quality and color appearance. In the second case, a user may limit the snapshot to the usage of this particular CMYK reference profile. Such a reference profile is typically smaller, e.g. gamut wise, than the media profile. The usage of the CIE Lab chart overcomes both limitations. As displayed in FIG. 6, introduced and discussed in detail hereinbelow, the chart is printed with a linear CIE Lab to CIE Lab reference and the appropriated media profile. This combination makes it possible to cover the whole color space of the printing device, because all possible CIE Lab values are within the color space of the CIE Lab to CIE Lab profile. In addition, the chart takes into the account the specifics of the media profile and enables the possibility of a realistic snapshot of the digital printing device at a specific point in time.

It should be appreciated that CMYK is a device dependent color space. But what is to be done with print jobs having a RGB color space? How can the results be applied to the reproduction of CIE Lab defined spot colors, e.g. Pantone?

Such questions may be answered and addressed with reference to FIG. 6 and to the described technique of using a CIE Lab chart, as follows:

Such CIE Lab chart is printed with color management such that the characteristics of the media profile is in the snapshot.

Such CIE Lab chart provides a description of the system in an independent color space. Thus, such chart is valid for any type of incoming data.

Figure 6:
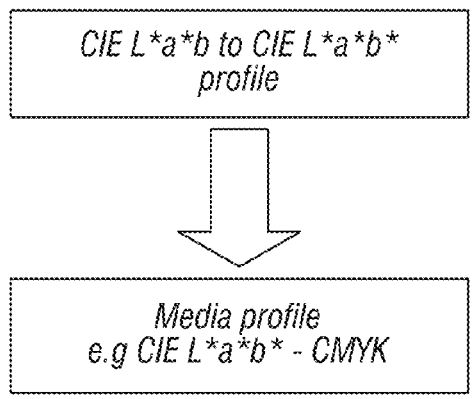
FIG. 6 is a block schematic diagram showing generating a media profile using a linear CIE Lab to CIE Lab reference, according to an embodiment.

Such CIE Lab chart may be adapted to the specifics of the printer (see FIG. 6.)

Thus, FIG. 6 illustrates that the system takes a linear Lab to Lab profile and the media profile and combines these two profiles within the CMM. Hence, the characteristic of the media profile is added to the evaluation.

Important is that the patches for such a chart are well distributed across the color space. There may be different distribution functions possible. For a general color space representation, it may be important that all areas within the color gamut are represented. Also a weighted representation may be possible. For example, in an embodiment, a weighted representation means that areas which are more critical for the particular printer may be represented with a higher number of patches and areas which are less critical may be represented with a lower number of patches. Areas may also be weighted differently. For example, areas which may be more critical for the human eye, e.g. grey or red areas, may be rated higher than less critical areas, e.g. light yellow.

Following is a novel extension to embodiments described hereinabove. In an alternate embodiment, the CIE Lab based chart provides the option to adapt it to the specific needs of the customer. A printer has a specific color space. Thus, it may be sufficient to take a snapshot of the color values within the color space of the printer. However, what about the color values of the particular print job that are outside of the gamut of the printer? When color values of a print job lie outside the gamut of the printer, then typically one of two rendering intent processes is used. One rendering process clips the colors of the print job to the border of the color gamut of the printer. The other rendering process moves those colors found outside the gamut into the printer color gamut. Hence, such colors are actually not printed outside of the printer gamut. Thus, an embodiment leverages the aforementioned knowledge and concentrates the snapshot on colors within the color gamut of the printer. That is, it is appreciated that it does not make sense to take a snapshot of the values that are outside of the gamut.

As well, in an embodiment, when the user desires to backup a print job and store the snapshot of the printer, the chart made for this configuration may take key colors of the particular job, e.g. spot colors such as full tonal value and tints, and balance the patches within the gamut in such a way that the areas which are used frequently within the job are represented more often than areas which are rarely or not used. In an embodiment, such print job is processed twice, as follows. For the first time, the process is used for generating a preview computation. For the second time, the process is used for the actual ripping of the print job.

In an embodiment, when computing the preview, the system accumulates the incoming color values. In an embodiment, the system builds a history of incoming color values. For example, such history may be used to take the most frequent incoming colors, e.g. as depicted in spikes of the histogram, and convert such colors along with the reference profile into the CIE Lab color space.

As well, in an embodiment it is possible to add elements to the current selection of most frequent incoming colors, such as other colors including the tint definition and the like. Such elements are included into the print job but may be independent of the process which determines the rate of how often particular colors appear within the particular job. Thus, it is possible to build on the one hand side a snapshot of the printer but that is weighted to the usage within the particular job.

Another important item in accordance with an embodiment may be the adaption of master and child systems. Some techniques may include calibrating the two devices separately and then using either a device link profile to adjust the child system to the master system or using the media profile of the master system for the optimization of the child system to get the child system closer towards the master system. Thus, embodiments described herein are different in at least the following matters:

The snapshot of the master system is done in an independent color space. The snapshot represents the machine itself and not a reproduction of a certain standard such as ISO, G7, etc. Thus, the color space of the device is represented and not a particular output procedure of a completely different process, such as offset, flexo, etc.

The child and the master system are optimized against the same, previously reached result. Thus, distances computed are the real, true distances. Further, the issues mentioned in the first paragraph of this section cannot happen in accordance with embodiments described herein.

The child system is optimized against the master snapshot and not against a previously reached state of this system. This approach gives the benefit that it is possible to move closer to the master system and does not limit the optimization to a previously reached result.

An Example Machine Overview

Figure 7:
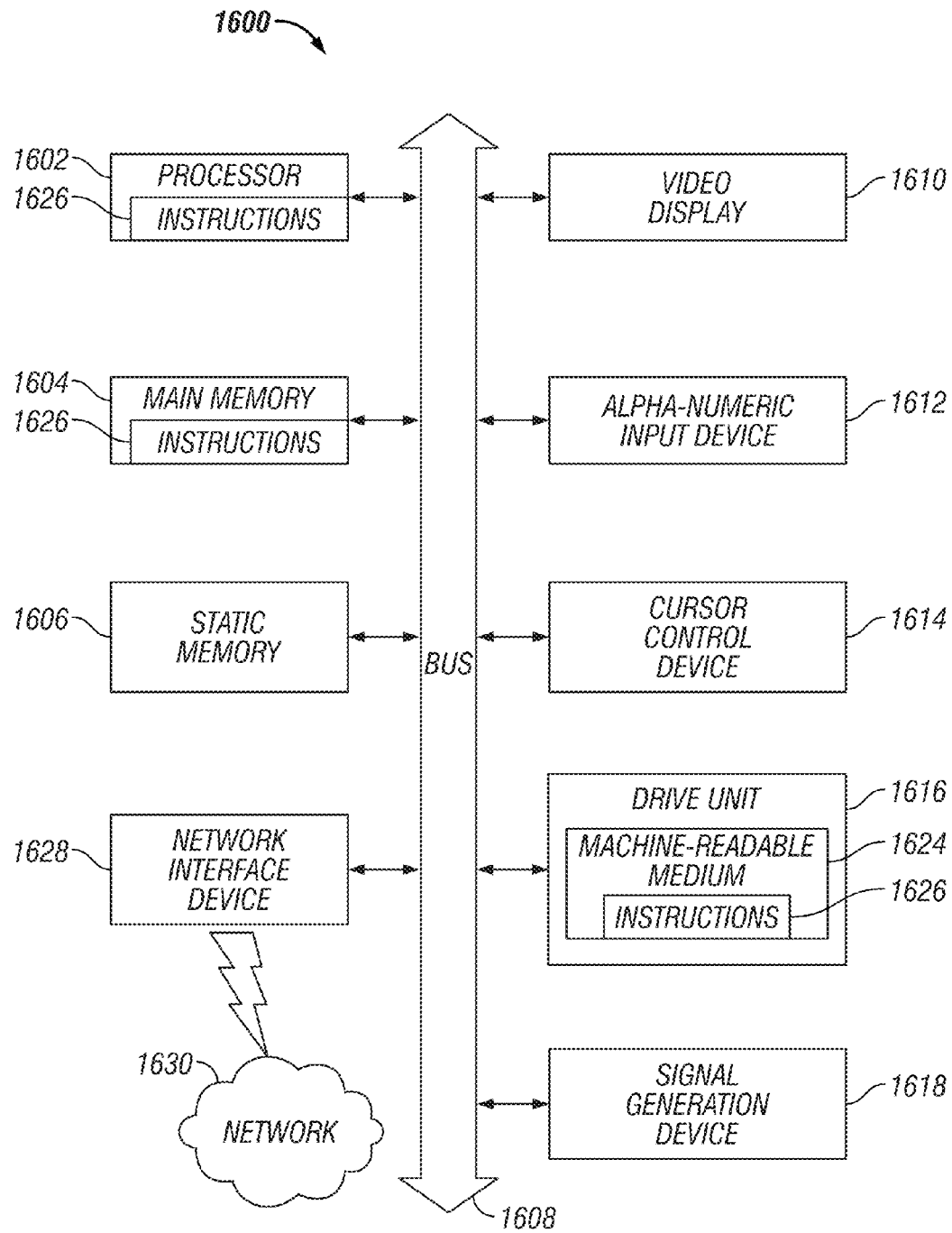
FIG. 7 is a block schematic diagram of a system in the exemplary form of a computer system according to an embodiment.

FIG. 7 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for providing color consistency, comprising the steps of:
    taking a snapshot of a target device's state by:
        generating and printing a color measurement chart comprising color patches that are defined in a device independent CIE L*a*b* color space for said target device, wherein said generating and printing the color measurement chart is processed by a color management unit (CMM) converting data using a linear CIE L*a*b* to CIE L*a*b* ICC profile, a media profile and printer linearization for the target device, and using a distribution function to distribute said color patches on the target color measurement chart such that areas which are more critical for the target device are represented with a higher number of patches and areas which are less critical are represented with a lower number of patches or areas which are more critical for the human eye are rated higher than less critical areas;
        measuring said color patches on said CIE L*a*b* target color measurement chart and generating corresponding target values;
        storing a source definition for said color measurement chart, the CIE L*a*b* sources values, and said target values in a particular container, which is associated with the calibration set, comprising the printer linearization and the media profile of the target device for a future comparison;
    at a time subsequent to said taking the snapshot of the target device's state, adjusting a new device to be at the target printer's state with the intention of achieving a same print result as that of the target device, by:
        printing a new color measurement chart comprising color patches defined in the CIE L*a*b* color space using the source CIE L*a*b* patch definitions at the new device;
        measuring patches on said new color measurement chart and generating corresponding measured values;
        comparing measured values from the new color measurement chart to said target values;
        based on said comparing, generating analysis values, said analysis values indicating whether the measured values from the new color measurement chart are within a tolerance value of the target values;
        when the measured values are not within the tolerance value of the target values:
            performing an optimization to cause subsequent measured values to be closer to said target values than said measured values; and
            returning control to the step of printing a new color measurement chart at the new device; and
        when the measured values are within the tolerance value of the target values, determining that the new device is ready for printing;
    wherein one or more steps are performed by one or more processors.

2. The method of claim 1, wherein the new device is the target device.

3. The method of claim 1, wherein the color measurement chart is generated by using a linear CIE L*a*b* to CIE L*a*b* ICC profile, a particular calibration set, a particular printer linearization, and a particular media profile, wherein the particular calibration set comprises a particular printer-ink/toner-media combination.

4. The method of claim 3, wherein said particular container corresponds to said particular calibration set.

5. The method of claim 1, wherein the target values represent a reference digital printing device and the subsequent measured values represent a different digital printing device.

6. The method of claim 1, wherein the analysis values comprise color distances including, CIE Delta E values, for each and every patch and wherein performing the optimization reduces the color distance between the target and subsequent measured values.

7. The method of claim 1, wherein when the new device has an embedded spectrophotometer, a schedule may be configured which causes one or more steps of the method to be performed automatically.

8. The method of claim 1, wherein the new device is a different device than the target device and has a wider color gamut or a same color gamut than the target device.

9. The method of claim 1, wherein an output is a CIE L*a*b* to CIE L*a*b* correction profile and is used on the new device corresponding to said measured values.

10. The method of claim 1, wherein said comparing measured values further comprises incorporating a direction of a Delta E value in addition to incorporating a magnitude of the Delta E value.

11. The method of claim 1, wherein said target color measurement chart is printed with color management such that characteristics of a corresponding media profile are captured.

12. The method of claim 1, wherein said target color measurement chart is configured to specifics of the new device by incorporating weighted representations of patches.

13. The method of claim 1, wherein when colors values of a particular print job are outside a gamut of the target device, applying at least one rendering process that causes the color values outside the gamut of the target device to move to the border of the gamut or to be clipped.

14. The method of claim 1, wherein when it is desired to back-up a print job and store a snapshot of the device with respect to the print job, the step of generating the target color measurement chart takes particular colors of the print job and balances the corresponding patches within the gamut of the target device in such a way that areas which are used frequently within the print job are represented more often than areas which are rarely or not used.

15. An apparatus for providing color consistency, comprising:
- a generating processor configured for generating and printing a color measurement chart comprising color patches that are defined in a device independent CIE L*a*b* color space for said target device, wherein said generating and printing the color measurement chart is processed by a color management unit (CMM) converting data using a linear CIE L*a*b* to CIE L*a*b* ICC profile, a media profile and printer linearization for the target device, and using a distribution function to distribute said color patches on the target color measurement chart such that areas which are more critical for the target device are represented with a higher number of patches and areas which are less critical are represented with a lower number of patches or areas which are more critical for the human eye are rated higher than less critical areas;
- a measurement device configured for measuring said color patches on said CIE L*a*b* target color measurement chart and generating corresponding target values;
- a storage configured for storing a source definition for said color measurement chart, the CIE L*a*b* sources values, and said target values in a particular container, which is associated with the calibration set, comprising the printer linearization and the media profile of the target device for a future comparison;
- a printing processor configured for printing a new color measurement chart comprising color patches defined in the CIE L*a*b* color space using the source CIE L*a*b* patch definitions at the new device;
- a measuring processor configured for measuring patches on said new color measurement chart and a generating processor configured for generating corresponding measured values;
- a comparing processor configured for comparing measured values from the new color measurement chart to said target values;
- a generating analysis values processor configured for generating analysis values based on said comparing, said analysis values indicating whether the measured values from the new color measurement chart are within a tolerance value of the target values;
- a performing processor configured for performing an optimization to cause subsequent measured values to be closer to said target values than said measured values and a returning control processor configured for returning control to the step of printing a new color measurement chart at the new device, in response to when the measured values are not within the tolerance value of the target values; and
- a determining processor configured for determining that the new device is ready for printing, in response to when the measured values are within the tolerance value of the target values.

16. A non-transitory computer-readable storage medium storing instructions which, when executed by one or more processors, cause the one or more processors to carry out the steps of:
- taking a snapshot of a target device's state by:
  - generating and printing a color measurement chart comprising color patches that are defined in a device independent CIE L*a*b* color space for said target device, wherein said generating and printing the color measurement chart is processed by a color management unit (CMM) converting data using a linear CIE L*a*b* to CIE L*a*b* ICC profile, a media profile and printer linearization for the target device, and using a distribution function to distribute said color patches on the target color measurement chart such that areas which are more critical for the target device are represented with a higher number of patches and areas which are less critical are represented with a lower number of patches or areas which are more critical for the human eye are rated higher than less critical areas;
  - measuring said color patches on said CIE L*a*b* target color measurement chart and generating corresponding target values;
  - storing a source definition for said color measurement chart, the CIE L*a*b* sources values, and said target values in a particular container, which is associated with the calibration set, comprising the printer linearization and the media profile of the target device for a future comparison;
- at a time subsequent to said taking the snapshot of the target device's state, adjusting a new device to be at the target printer's state with the intention of achieving a same print result as that of the target device, by:
  - printing a new color measurement chart comprising color patches defined in the CIE L*a*b* color space using the source CIE L*a*b* patch definitions at the new device;
  - measuring patches on said new color measurement chart and generating corresponding measured values;
  - comparing measured values from the new color measurement chart to said target values;
  - based on said comparing, generating analysis values, said analysis values indicating whether the measured values from the new color measurement chart are within a tolerance value of the target values;
  - when the measured values are not within the tolerance value of the target values:
    - performing an optimization to cause subsequent measured values to be closer to said target values than said measured values; and
    - returning control to the step of printing a new color measurement chart at the new device; and
  - when the measured values are within the tolerance value of the target values, determining that the new device is ready for printing.

* * * * *